Oct. 2, 1951        T. W. KENYON        2,569,676

CONTROLLED FLIGHT EQUIPMENT

Filed Dec. 22, 1945        3 Sheets-Sheet 1

INVENTOR.
Theodore W. Kenyon
BY
Hobart N. Durham
ATTORNEY

Oct. 2, 1951 T. W. KENYON 2,569,676
CONTROLLED FLIGHT EQUIPMENT
Filed Dec. 22, 1945 3 Sheets-Sheet 2
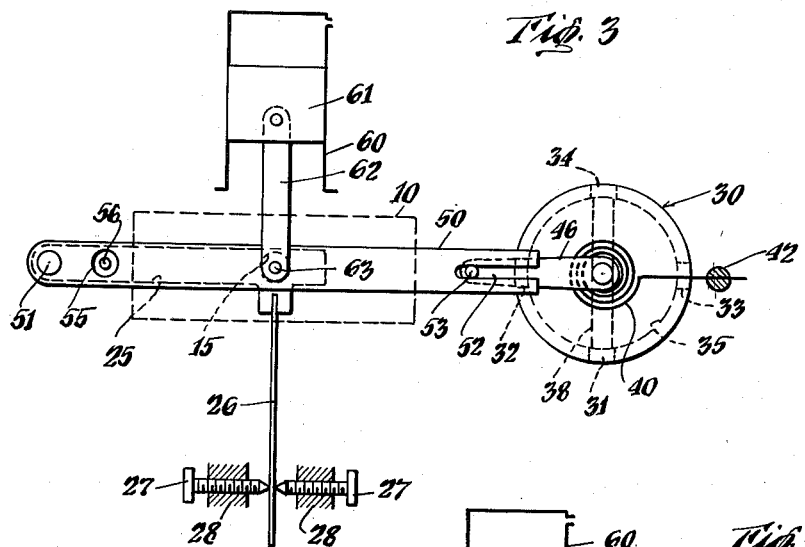
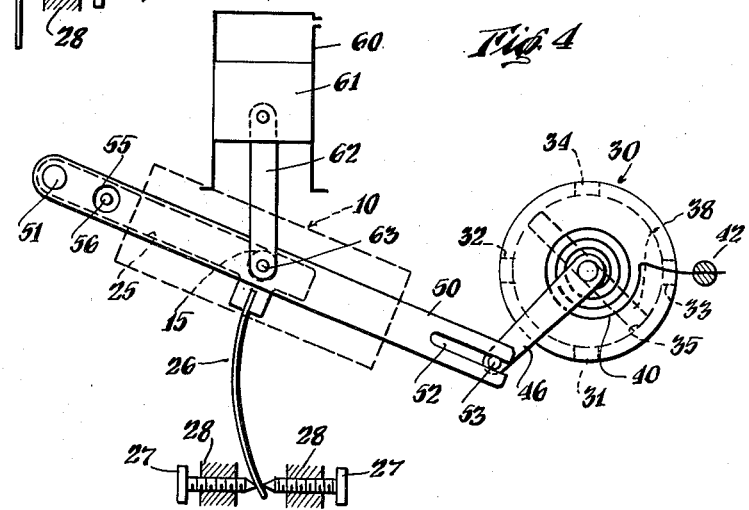
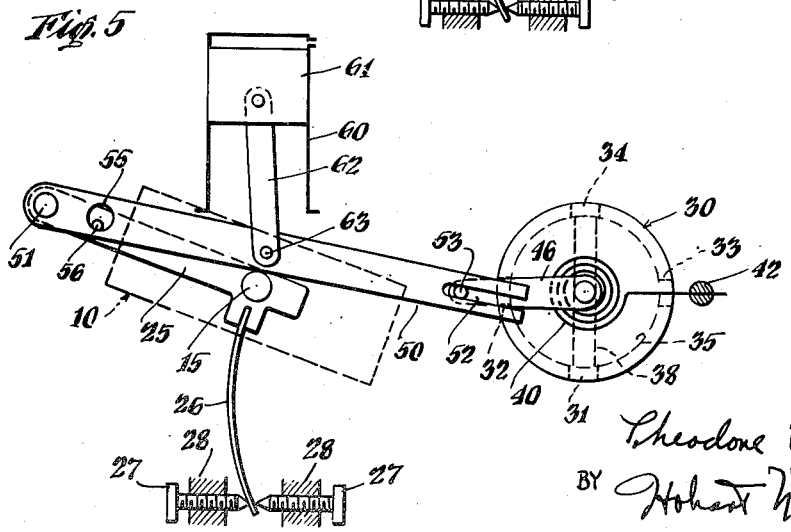
INVENTOR
Theodore W. Kenyon
BY Hobart N. Durham
ATTORNEY Oct. 2, 1951 T. W. KENYON 2,569,676
CONTROLLED FLIGHT EQUIPMENT
Filed Dec. 22, 1945 3 Sheets-Sheet 3
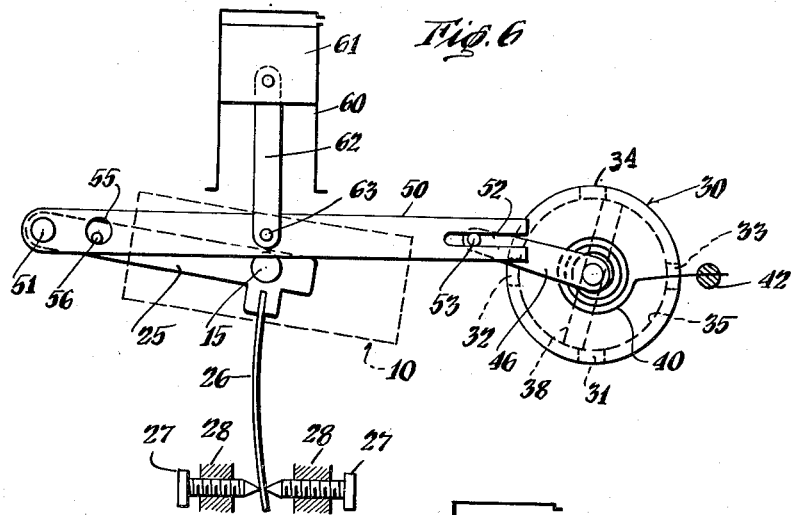
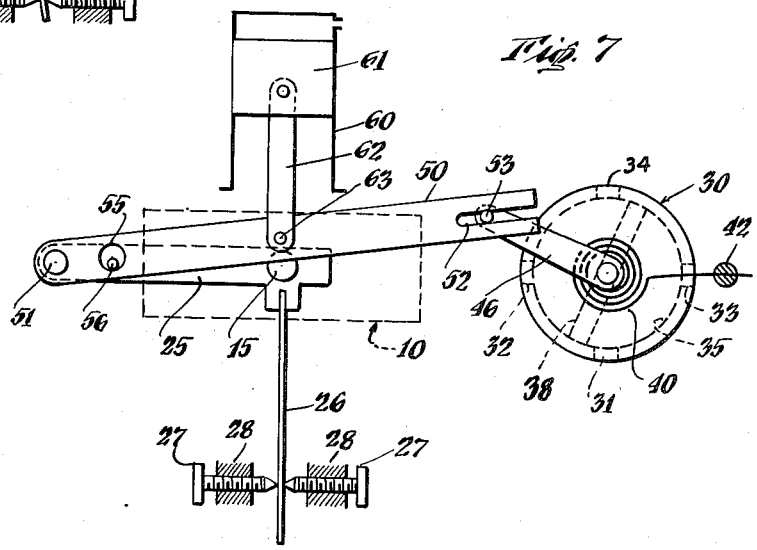
INVENTOR
Theodore W. Kenyon
BY
ATTORNEY Patented Oct. 2, 1951

2,569,676

UNITED STATES PATENT OFFICE 2,569,676

CONTROLLED FLIGHT EQUIPMENT

Theodore W. Kenyon, Huntington, N. Y., assignor, by mesne assignments, to the United States of America as represented by the Secretary of the Navy Application December 22, 1945, Serial No. 637,058

10 Claims. (Cl. 137—139)

1

The present invention relates to a new and improved rate responsive control having a signal pick off, and more particularly to a gyroscopic controlled differential air valve responsive to change in rate of angular motion.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figures 3 to 7 are various views showing schematically the relative relation of the principal parts as the instrument of the present invention is subject to different forces by turning of the aircraft or other vehicle.

Figure 1:
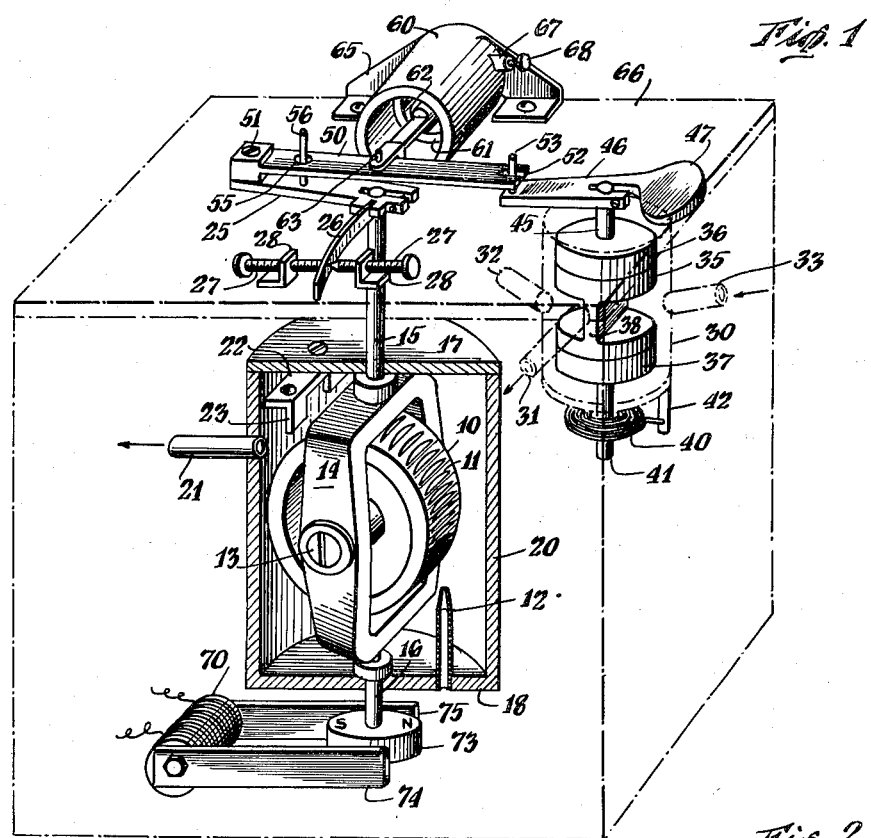
Figure 1 is a perspective view showing a typical and illustrative embodiment of the invention, being shown with an air driven gyroscope controlling a valve for creating air signals.
Figure 2:
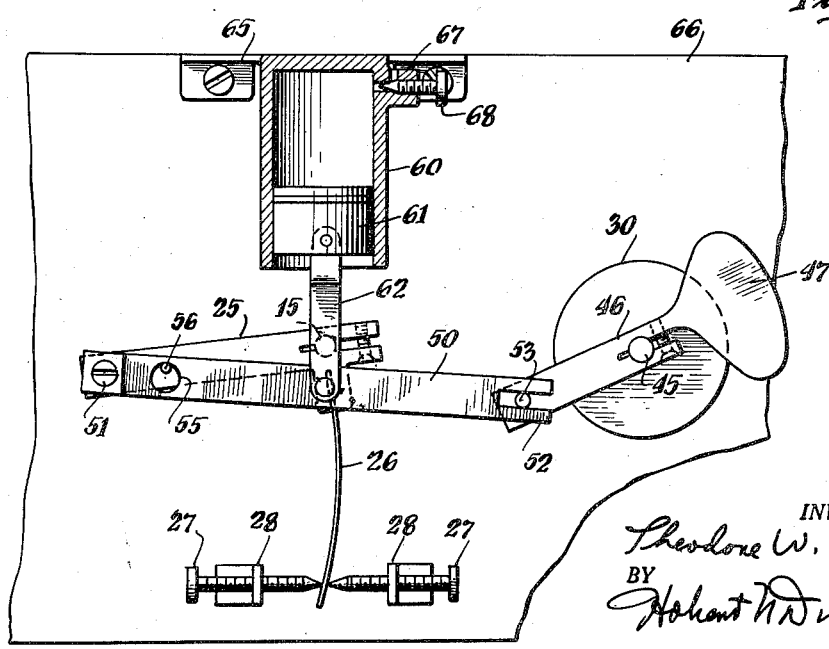
Figure 2 is a schematic plan view of certain parts showing them in a displaced position.

The present invention has for its object the provision of an improved rate gyroscopic device for use as part of automatic pilots such as are used to control aeronautical flight. A further object is the provision of a differential air valve device which is responsive to any change, whether increase or decrease, in the rate of angular motion of the aircraft, or other dirigible body. The invention further provides a differential signal device automatically controlled by a gyroscope upon a change in the rate of angular motion, and also upon actuation of another member, whereby the gyroscope controlled signal, or absence of signal, may be superseded in whole or in part by the actuation of the other member.

In accordance with the present invention, and particularly referring to the illustrative embodiment, there is provided a gyroscope rotor unit which may be air driven, as exemplary of an element tending to have a fixed angular position in space. This gyroscope rotor unit is mounted as usual to spin about an axis, and is also mounted for angular movement or precession of its spin

2 axis about an axis of precession or oscillation by means of a frame pivoted on an axis at right angles to the spin axis. The second axis is connected to angularly move an element which in turn moves a lever pivoted at three points spaced along its length and at different distances from said second axis. One pivot point may yield slowly in a direction more or less normal to the length of the lever, the second pivot point is connected to and at a distance from the second axis of the gyroscope while the third pivot point is connected to a member tending to resiliently return it to a normal position of rest, said third pivot also being connected to a signal controlling element, such as a differential air valve, whereby any departure of the third pivot from its normal position establishes a signal, preferably proportional to the extent of the displacement of the pivot and having a sense distinguishing between the different directions of displacement of the third pivot.

Means are also preferably provided for momentarily imparting an additional torque to the gyroscope about the second axis whereby the signal established by the angular space movement of the rotor axis may be increased or decreased in whole or in part at the will of the pilot, or automatically. Illustratively, a small magnet having its poles diametrically opposed may be fixed to the second axis and is urged from its normal position, in one direction or another, for instance by means of an electromagnetic field of reversible polarity which may be controlled at will. Thus by an impulse, a momentary signal may be established, which immediately begins to decay but has had an immediate effect on the controls of the aircraft or other moving vehicle, which effect is only gradually neutralized as the impulse is continued and reverses when the impulse is discontinued.

Illustratively, the air driven gyroscope is mounted for free rotation on its spin axis in a frame which is pivoted for angular movement about a desired axis, preferably normally horizontal in the line of movement of the spin axis or at right angles thereto or normally vertically at right angles to the line of movement of the aircraft vehicle. The slowly yieldable pivot connection of the triple pivoted lever may comprise a dash pot, while the third pivot point is spring returned to a normal central position of rest. A further spring is also provided for returning the lever and the gyroscope frame to a normal position, and this last spring preferably provides for a limited amount or degree of unrestrained movement of the gyroscope about its second, or precessional, axis.

Any angular movement of the gyroscope rotor thus causes a corresponding movement of the gyroscope frame about its axis, causing an immediate signal from the signal creating means, the direction of the signal corresponding to the direction of the angular movement of the frame about the second gyroscope axis. The intensity of the signal in either direction is in accordance with, although not necessarily proportional to angular acceleration of the spin axis of the gyroscope, or the second derivative of the turning of the aircraft or other vehicle from its normally straight forward path. When the rate of turning remains constant, the dash pot and the centralizing spring act to reduce the signal and the restoring spring acting on the gyroscope frame also acts to tend to restore the gyroscope to a normal position but is opposed by the gyroscope torque developed by the turning of the aircraft.

In the case where the aircraft is increasing its rate of turn and the aircraft is controlled to reduce the rate of turn, there is a change in the rate of turn and the resulting signal is correspondingly changed due to the slowness with which the dash pot pivot moves, the other two pivots of the lever being movable with much greater rapidity.

Means are also provided whereby more than a certain angularity of movement of the gyroscope frame causes and immediate and positive movement of the signal control meaans regardless of the position of the dash pot pivot.

Preferably, each gyroscope is responsive to one axis of movement only and in most applications there will be three gyroscopes in accordance with the present invention. One such gyroscope will be mounted having its axis parallel to the normal, straight, forward direction of aircraft flight; the second will have its axis at right angles thereto but in a normally horizontal plane; while the third will have its axis at right angles to the two others and substantially vertical to the normal line of flight. In other installations, however, only two or one such gyroscopically controlled signal creating means may be required.

It will be understood that the foregoing general description and the following detailed description as well are exemplary and explanatory of the invention but are not restrictive thereof.

Referring now in detaail to an illustrative and the preferred embodiment of the invention as shown in the accompanying drawings, an element is provided which normally has a fixed angular position in space, and is illustratively shown as gyroscope rotor 10, the periphery of which is formed with buckets 11 onto which a stream of air impinges from the nozzle 12 thereby driving the gyroscope rotor. The rotor 10 is mounted by a shaft in suitable antifriction bearings 13 carried in frame 14, which frame is pivotally mounted by shafts 15 and 16 providing a pivot axis at right angles to the gyroscope rotor axis. Shafts 15 and 16 are journalled in the plates 17 and 18 forming the end-walls of a housing 20 which is preferably airtight and is provided with an outlet port 21 through which air is exhausted to cause the flow of air through the nozzle 12.

Gyroscope rotor 10 may have its axis parallel to the line of flight or movement of the aircraft or other vessel, or at right angles thereto and in a horizontal plane or in a vertical plane or may otherwise be positioned as desired. In most instances, three separate elements each having a fixed but different angular position in space will be provided on each aircraft or vessel, the axes corresponding to the three different axes about which an aircraft may move.

Within the housing 20, and fixed to the endwall 17 thereof is a stop 22 having depending fingers 23 adapted to contact with a portion of the frame 14 so as to limit precessional movement of the gyroscope.

Means are provided permitting the gyroscope to have limited free precessional movement, if desired, and for resiliently returning the gyroscope to a normal position in case it has precessed beyond its free precessional limit. As embodied, shaft 15 is provided with a radially extending arm 25 from which projects a radial leaf spring 26, its free end being positioned between the stop screws 27 threaded in supports 28 and adjustable toward and from each other so as to allow a variable degree of free precessional movement of the gyroscope, and also to provide for the centralizing adjustment of the normal position of the gyroscope.

On angular movement of the aircraft with reference to the axis of the gyroscope rotor, the gyroscope precesses, causing arm 25 to swing in one direction or the other, first without restraint if desired, and then subject to the resilient restraint imposed by the spring 26 thereby limiting the precessional movement of the gyroscope at the point where the force exerted by the spring equals the precessional torque. When the angular movement has ceased, the spring 26 then exceeds the precessional torque, and the resilient force exerted by the spring tends to drive the gyroscope rotor axis and the frame 14 to a new angular position in space.

Means are also provided for creating a signal which preferably varies not only in intensity but also varies in sense, and this signal may conveniently be a change in air pressure; an increase in pressure representing one direction of movement with respect to the fixed direction of flight, while a decrease in pressure represents the other direction of movement with respect to the fixed direction of flight, the intensity of the signal in each case being controlled by the rate at which the angular movement with respect to the fixed element is taking place.

As embodied, there is provided an air valve 30 comprising a cylindrical chamber having an eduction port 31 through which air may be withdrawn from the diametrally spaced inlet port 34 or either or both of the signal ports 32 and 33, which ports are preferably equally spaced from the ports 31 and 34, and may be of the same size. Within the casing 30, and closely fitted thereto, yet having sufficient clearance so as to be freely movable with a minimum of friction, is provided a valve member 35 which comprises upper and lower cylindrical portions 36, 37 connected by means of a narrow diametrically extending web 38, the width of the edge of web 38 being almost as great as the diameter of the eduction and inlet ports 31 and 34, so that the web 38 never completely closes ports 31 and 34.

Means are provided for yieldably returning the valve member 35 to a normal central position and for this purpose a hair spring 40 is made fast to shaft 41 which extends from the valve member 35, the other end of the hair spring being anchored in post 42 carried by the housing 30. Thus the valve member 35 is normally returned to a position where the web 38 substantially closes ports 31 and 34 leaving equal arcuate openings at either side of the web 38 so that air continually is withdrawn in equal quantities through the ports 32 and 33.

The other end of the valve member 35 is provided with a shaft 45 to which is connected an arm 46 having a counterbalance 47 so that the arm and valve member 35 are in static balance for all positions. Arm 46 is preferably so located that with valve member 35 in its normal position of rest, arm 46 extends directly toward the gyroscope precessional axis 15.

Means are provided for interconnecting the gyroscope frame and the valve member 35 so that extreme precessional movement of the gyroscope in either direction causes a positive movement of the valve member in one direction or the other, dependent upon the direction of precession. For this purpose a link 50 is pivotally connected by pivot screw 51 to an arm 25, and at its other end link 50 is forked, as at 52 to fit over a pin 53 carried by arm 46. Lever 50 is provided with an aperture 55 through which passes a pin 56 carried by arm 25 at a point intermediate the shaft 15 and pivot screw 51, the clearance between aperture 55 and pin 56 providing limited free movement of the lever 50 with reference to the arm 25. When this free movement is exceeded, the position of the valve is determined by two factors: (1) the angular acceleration, which determines the position of dashpot piston 61, and (2) the rate of turn, which gives the valve an additional movement due to contact of pin 56 with the wall of opening 55. As the gyroscope precesses in a clockwise direction, valve member 38 is thereby turned in a counter-clockwise direction to establish a suction signal at port 32, and an air signal at port 33, while similar air and vacuum signals would be established at ports 33 and 32 respectively by the opposite movement of the parts. Thus on an extreme angular rate of the aircraft with reference to the restrained gyroscope, a signal is established at port 32 or 33 corresponding to the rate of angular turning of the vehicle in one plane.

Means are also provided for controlling the valve member 38 to establish a signal dependent on the angular acceleration in one plane of a vehicle as it moves with respect to the gyroscope spin axis, and for this purpose yieldable means, preferably having a variable but slow response, are actively connected to control the movement of the valve member 38 on any precessional movement of the gyroscope. For this purpose there is provided a dash pot 60 comprising a cylinder open at one end in which slides a closely fitted piston 61, said piston having a link 62 by which it is pivotally connected to an intermediate portion of lever 50, the pivot pin 63 preferably alined with the precessional axis or shaft 15.

Dash pot 60 is mounted by bracket 65 on plate 66 to which the gyroscope casing 20 is fixed. At the closed end, the cylinder is provided with a bleed port 67 which is regulably restricted by needle valve screw 68 so that the flow of air into and out of the dash pot chamber may be regulated at will. The dash pot thus provides a slowly yieldable fulcrum for the lever 50 to cause displacement of the valve member 38 on any precessional movement of the gyroscope, and causing a considerable signal to be established, which signal decays unless further precessional movement of the gyroscope takes place, due to the resilient pressure exerted by hair spring 40 through arm 46 on the end 52 of lever 50, thereby causing piston 61 to assume a new position. However, when the precessional torque ceases to increase, spring 26 holds the gyroscope in its displaced position, causing a reversal of the direction of movement of the lever 50 and valve member 35, as the hair spring 40 acts tending to move piston 61 towards its original position.

Means are also provided for moving the gyroscope from the position it normally tends to have, to cause a momentary change in the signal produced by the signal-producing means, either decreasing, increasing or reversing the signal otherwise produced by the relative angular movement of the aircraft and gyroscope. As embodied a cylindrical permanent magnet 73 is mounted near the end of shaft 16, magnet 73 having its poles diametrically spaced from each other, and magnet 73 is positioned between pole pieces 74 and 75 of electromagnet 70, the poles of magnet 73 being normally positioned at right angles to the field created by the electromagnet 70. As magnet 70 is energized, a rotational effort is thus exerted on the magnet disc 73 and on the gyroscope, while a reversal of the current flowing through the winding of magnet 70 causes a reverse movement of the magnet disc 73.

In normal straight flight considering the instrument as having the gyro spin axis parallel to the line of flight and the precessional axis substantially vertical:

Spring 26 has returned the gyroscope to normal central position, dash pot piston 61 is centralized, lever 50 lies with its pivot 63 over shaft 15 and valve 30 is in its neutral position with air being drawn through eduction port 31 and equally through ports 32 and 33 creating equal signals in the two lines connected with these two ports as port 34 is substantially closed.

Figures 3 to 7 of the accompanying drawings show certain of the instrument parts as they react to different rates of turning of the aircraft or other vehicle.

In Figure 3, the aircraft is maintaining a steady straight course, the gyroscope spin axis is in its normal position, which may be parallel to the course or at right angles thereto. In this position, all parts are centralized and equal suction is created at ports 32 and 33, so that no signal is established at either port, or it may be considered as establishing equal signals at the two ports.

Figure 4 shows the position of the same parts when the vehicle is making a left turn and the angular acceleration in turning is quite large, as at the beginning of a sharp left turn. Dash pot piston 61 tends to move only very slowly from its centralized position, the gyroscope 10 tends to remain parallel to its original spin axis, but its free movement is resisted by spring 26 and the gyroscope will assume a position where its precessional torque is balanced by the spring 26. Pivot 51 causes lever 50 to be swung to swing valve member 38 so as to establish a free path between the suction port 31 and signal port 32, and between signal port 33 and the air port 34, thereby causing full application of the suction to port 32 and simultaneously allowing air to flow to the port 33, thereby establishing the maximum differential pressure between the ports 32 and 33.

Figure 5 shows the instrument as the vehicle continues to turn to the left but at a constant rate of turning. In this figure, the gyroscope axis is still displaced in accordance with the rate of turning of the vehicle, but dash pot piston 61 has moved under the influence of the hair spring 40, and valve member 38 has been restored to its central position thereby equalizing the signal at ports 32 and 33.

Figure 6 illustrates the position of the parts as rate of turning decelerates. The gyroscope is not displaced so far to the right, showing that the rate of turning of the vehicle to the left has been reduced as the precessional torque is less. This movement causes valve member 38 to be swung clockwise to a slight extent thereby increasing the suction applied to port 33 and increasing the flow of air to port 32.

Figure 7 shows the result of further deceleration of the rate of turning of the vehicle to a point where the turn is completely stopped. When stopped, the gyroscope axis is parallel to the course of the vehicle, dash pot piston 61 will slowly return to its central position under the influence of hair spring 40, but the deceleration of the rate of turning has increased the suction signal applied to port 33 and the flow of air to port 32.

As the vehicle reaches its steady straight course, gyroscope 10 remains in its parallel position, while dash pot piston 61 yields under the influence of the hair spring 40 until valve element 38 is centralized with respect to ports 32 and 33, thereby allowing equal suction to be applied to both ports 32 and 33, the same position as is shown in Figure 3.

If the vehicle is turned to the right, instead of to the left, the operation of the parts of the instrument are reversed from those just described.

While the movements have been described with reference to a straight course, and with respect to a gyroscope having its axis normally parallel thereto, it will be understood that similar movements will take place if the gyroscope axis is parallel to either of the other two axes of turning of an aircraft, and that the responses to such turning will be similar.

In addition to the foregoing movements of the valve under different conditions as created by the angular movement of the aircraft in flight, means are provided for momentarily angularly moving the gyroscope with respect to a spatially fixed line, and this is accompanied by energizing the electromagnet 70 so that the armature 73 tends to move in one direction or the other, thereby imparting a momentary torque to the precessional axis of the gyroscope.

Signals from the signal means may be variously employed, such as for the actuation of indicating instruments, or the direct or indirect control of control surfaces of the aircraft. Thus, exemplarily, one control device may control the rudder of an airplane, another the ailerons and a third the elevators whereby flight in any altitude may be controlled or maintained.

The invention in its broader aspects is not limited to the specific mechanisms shown and described but departures may be made therefrom within the scope of the accompanying claims without departing from the principles of the invention and without sacrificing its chief advantages.

What is claimed is:

1. In a control device, an element tending to have a fixed angular position in space, a lever movable relatively to said element and pivotally connected thereto, a slowly yieldable member pivotally connected to said lever, a restrained member having a normal position relatively to said element, a device adapted to be actuated as said restrained member is moved in one direction or the other from its normal position, means for displacing said element when the other members have moved relative thereto more than a predetermined degree and means for imposing on said element an angular turning movement.

2. In a control device, an element tending to have a fixed angular position in space, a lever movable relatively to said element and connected thereto for free angular movement, a member pivotally connected to said lever and slowly yieldable in either of two directions as said lever and element are relatively moved, a member having a normal position relatively to said element and restrained from movement away from said normal position and means controlled by and distinguishing between movement of said last member away from its normal position in one direction or the other.

3. In a control device, a gyroscope tending to have a fixed angular position in space, a lever movable relatively to said element and connected thereto for free angular movement, a member pivotally connected to said lever and slowly yieldable in either of two directions as said lever and element are relatively moved, a member having a normal position relatively to said element and restrained from movement away from said normal position and means controlled by and distinguishing between movement of said last member away from its normal position in one direction or the other.

4. In a control device, a gyroscope having its axis mounted in a frame pivoted on an axis at right angles to the gyroscope axis, an arm fixed to the frame, a spring connected to said arm and tending to restore the frame to a normal position on relative movement of the gyroscope relative to its normal angularly fixed position, a rotatable device, a lever, and a slowly yieldable link, said link, arm and signal means being pivotally connected at spaced points to said lever.

5. In a control device, a gyroscope having its axis mounted in a frame pivoted on an axis at right angles to the gyroscope axis, an arm fixed to the frame, a spring connected to said arm and tending to restore the frame to a normal position on relative movement of the gyroscope relative to its normal angularly fixed position, a rotatable device, a lever, a slowly yieldable link, said link, arm and device being pivotally connected at spaced points to said lever, and means for momentarily angularly urging said frame in one direction or the other.

6. In a control device, a gyroscope having its axis mounted in a frame pivoted on an axis at right angles to the gyroscope axis, a leaf spring connected to cause the frame to follow said leaf spring, said leaf spring having a limited free movement with said frame, an arm fixed to said frame, a dash pot and an oscillatable arm having a spring tending to restore said arm to a normal position and a lever connected to said arm, dash pot and oscillatable arm at points spaced along said lever.

7. In a control device, a gyroscope having its axis mounted in a frame pivoted on an axis at right angles to the gyroscope axis, a spring connected to cause the frame to follow said spring, an arm fixed to said frame, a dash pot and an oscillatable arm having a spring tending to restore said arm to a normal position and a lever connected to said arm, dash pot and oscillatable arm at points spaced along said lever.

8. In combination with a gyroscope rotor mounted in a frame for precessional movement, means supporting the frame to permit the precession, and a device to be actuated in accordance with precession in either direction, a linkage connected between said frame and said device to actuate the latter, and means connected between said linkage and said supporting means to yieldingly resist precessional movement in either direction, said last named means including a leaf spring secured at one end thereof to said linkage, and adjustable screw means secured to said supporting means and cooperating with the spring near the other end thereof to provide an adjustable tension on said linkage.

9. In claim 8, means associated with said frame and operable to impart a momentary initial torque thereto.

10. In claim 8, said linkage having a neutral position and embodying a lost motion connection permitting it to travel slightly to both sides of such position without imparting movement to said device.

THEODORE W. KENYON.

REFERENCES CITED

The following references are of record in the file of this patent:

UNITED STATES PATENTS

| Number | Name | Date |
|---|---|---|
| 2,208,666 | De Florez | July 23, 1940 |
| 2,290,232 | Fischer | July 21, 1942 |
| 2,299,117 | Manteuffel | Oct. 20, 1942 |
| 2,397,949 | Curry | Apr. 9, 1946 |
| 2,427,549 | Carlson | Sept. 16, 1947 |

FOREIGN PATENTS

| Number | Country | Date |
|---|---|---|
| 113,306 | Australia | June 16, 1941 |